US006629245B1

(12) United States Patent
Stone et al.

(10) Patent No.: US 6,629,245 B1
(45) Date of Patent: Sep. 30, 2003

(54) APPARATUS FOR STIMULATING KEYPAD ENTRY OF AN ACCESS CODE INTO A KEYPAD TYPE SECURITY SYSTEM

(76) Inventors: Arthur D. Stone, 2311 Westrock Dr., Austin, TX (US) 78704; William T. Mostyn, 821 Camp Dr., Waco, TX (US) 76710; Maurice D. Krugman, 2505 Antlers Ct., Plano, TX (US) 75025

( * ) Notice: Subject to any disclaimer, the term of this patent is extended or adjusted under 35 U.S.C. 154(b) by 0 days.

(21) Appl. No.: 09/422,173

(22) Filed: Oct. 22, 1999

(51) Int. Cl.[7] ......................... G06F 11/30; G06F 12/14; H04L 9/32

(52) U.S. Cl. ......................... 713/201; 340/22; 235/382; 235/375

(58) Field of Search ............................ 340/22, 26, 30, 340/5.2, 5.65, 5.54, 5.85; 235/382, 382.5, 375, 384, 492

(56) References Cited

U.S. PATENT DOCUMENTS 4,297,569 A * 10/1981 Flies .......................... 235/443
4,864,115 A * 9/1989 Imran et al. ................ 235/492
5,214,785 A * 5/1993 Fairweather ................. 710/67
5,283,431 A 2/1994 Rhine
5,361,062 A 11/1994 Weiss
5,373,146 A 12/1994 Lei
5,374,818 A 12/1994 Bianco
5,397,884 A 3/1995 Saliga
5,923,264 A * 7/1999 Lavelle et al. ............. 340/5.64

OTHER PUBLICATIONS

Radio—Electronics, Dallas Semiconductor touch memory starter kit, Mar. 1992, vol. 63 issue 3 p. 24.*

Scott, Brenda; Conzola, Vincent. 'Designing touch screen numeric keypads: Effects of finger size, key size and key spacing.' Proceedings of Hunman Factors and Ergonomics Society v 1 1997 pp. 360–364.*

Paelke, Gretchen M. 'Comparison of route guidance destination entry methods'. Designing for Diversity Proceedings of the Human Factors and Eronomics Society v 1 1993. pp. 569–573.*

Geiser, G. 'hanprinted dataentry with a touch–sensitive numeric keypad'. NTZ Archiv vol. 11 No. 3 pp. 153–158.*

Taylor, Allen G. 'NICE development'. Apr., 1993 DBMS v6 n4 pp. 32–33.*

O'Malley, Christopher. 'Smart phones' Jan. 1992 Popular Science, v240, n1 pp. 70–75.*

Hodgson, Karyn. 'High–tech simplicity: Keys and tokens stay familiar' Security; Newton, Aug. 1994 vol. 31 issue 8 p. 17.*

Bert, Moore. 'Contact memory offers the right touch'. Automatic I.D. News vol. 14, issue 6 pp. 31–33.*

Singer, Tom. The Great data grab' Dec. 1998 IIE Solutions vol. 30 issue 12 pp. 35–38.*

Book—entitled Book of DS19xx—Touch Memory Standards by Dallas Semiconductor (154 pages).

* cited by examiner

*Primary Examiner*—Gail Hayes
*Assistant Examiner*—Paula Klimach
(74) *Attorney, Agent, or Firm*—Sturm & Fix LLP

(57) ABSTRACT

An apparatus for simulating keypad entry of an access code into a security system controller. The apparatus comprises at least one electronic key encoded with a electronic key identifier, at least one electronic key reader adapted to electronically interface with the electronic key to electronically transfer data signals therebetween, a security system controller having memory for storing at least one security code therein and operably connected to a keypad for entering access codes thereon, and simulator circuitry electrically connected to the electronic key reader and operably electrically connected to the security system controller, whereby upon presentation of the electronic key to the electronic key reader, the simulator circuitry interrogates the electronic key then translates the electronic key identifier into an access code. The simulator circuitry then generates output signals to the security system controller to simulate pressing of keys on the keypad corresponding to the access code, whereupon if the simulated access code matches one of the security codes stored in the security system controller's memory, the security system will be activated/deactivated as if the access code was manually entered through the keypad.

9 Claims, 6 Drawing Sheets

APPARATUS FOR STIMULATING KEYPAD ENTRY OF AN ACCESS CODE INTO A KEYPAD TYPE SECURITY SYSTEM

STATEMENT REGARDING FEDERALLY SPONSORED RESEARCH OR DEVELOPMENT

Incorporation-by-reference is hereby made to the computer program listing appendix which includes a Source Code file for two variations of the keypad simulation apparatus as DSK406.src, 17,408 bytes, created in final version on Jul. 28, 1996; DSK22100.src, 18,389 bytes, created in final version on Jul. 28, 1996; and DSKEY.src, 18,389 bytes, created in final version on Jul. 28, 1996; and an Assembled Files file containing all the object and program codes for direct programming of the computer chips as required to make the systems operate for archival storage and back up only.

CROSS-REFERENCE TO RELATED APPLICATIONS

Not Applicable.

CROSS-REFERENCE TO MICROFICHE APPENDIX

Not Applicable.

BACKGROUND OF THE INVENTION

1. Field of the Invention

This invention relates generally to security systems which require keypad entry of a security code for activation/deactivation of the security system, and more particularly to a security system which includes an apparatus and method of electronically simulating keypad entry of a security code to overcome the shortcomings of such keypad type security systems.

2. Description of the Related Art

In conventional alarm systems, usage authorization systems, round recording systems, job costing and accounting systems, etc., referred to collectively and/or individually hereinafter as "security system" or simply "system", a security system controller having a numeric or alphanumeric keypad on its face panel or on a face panel of a remote entry station, is employed to allow entry of a security code to activate and/or deactivate the system. These security codes are typically programmed into the security system controller by the security system supplier. Many system controllers allow for a number of security codes to be programmed into a single system, thereby allowing a number of individuals to have their own unique code. It is not uncommon in many security systems to have to update the security system controller to allow for the addition of new security codes or the deletion of old security codes as authorized users change. To minimize on-site work, many security systems allow updating of the security codes by the security system supplier through remote programming of the security system controller through telephone line connections.

As previously mentioned, many security systems require keypad entry of the security code to activate/deactivate the system. Unfortunately there are al number of shortcomings to keypad entry of security codes. For example, individuals often forget their security codes, or enter their security codes incorrectly, or share their security codes with others for whom access is not authorized. Another shortcoming is that unauthorized users may be able to obtain another's security code by watching the authorized user enter his or her security code through the keypad.

To overcome these shortcomings of systems requiring keypad entry of access codes, other security systems have been developed which utilize bar code scanners, magnetic strips on plastic cards, radio-frequency (RF) proximity cards and electronic key readers. However, each of these types of security systems have their own shortcomings.

Bar code scanner systems, for example, are generally more expensive than keypad type control panels because they require more sophisticated components such as electro-optical readers which must cope with marginal signals as they occur with changing scanning speed, varying scanning angle, poor contrast, dirt, and sunlight which impairs the readability of the bar code due to high ambient light. After the reflected light is converted to an electrical signal, the symbology must be decoded to obtain the desired character code.

Magnetic strip systems suffer from similar problems. The magnetic strips are susceptible to magnetic fields which can inadvertently erase the data on the card. Magnetic strip cards are also sensitive to dirt, scratching and bending. Further, because the data density of magnetic strips is significantly higher than that of bar codes, the magnetic strip readers need precise mechanics for correct alignment and smooth and continuous movement of the card.

RF proximity cards are subject to inherent problems such as range of reception and energy consumption by the proximity card reader, which may be quite high. Additionally, RF proximity cards are prone to interference from radio stations, electronic equipment, etc. A more serious concern with RF proximity cards is the availability of frequencies for the receive and transmit channels and the approval of national authorities. Every country has its own rules and frequencies, which prevents a common standard for world-wide used.

The shortcoming of currently available electronic key readers is the need to program the electronic key reader with a valid encoding number. This programing of the electronic key reader does not correlate with the security system, and therefore, when the security system controller is updated by the security system supplier, usually remotely as described above, to add new security codes or delete old security codes from the system controller's memory, on-site work is required by the system supplier to reprogram the electronic key reader.

Accordingly, it would be desirable to devise an apparatus and method of entering an access code into a security system which overcomes the shortcomings of keypad entry, namely users forgetting their code, entering the incorrect code, sharing the code with unauthorized users, and preventing the possibility of others observing the code during keypad entry. Further, it would be desirable to devise a method of entering an access code into a system which is less expensive than the alternatives to keypad type systems and overcomes the above described shortcomings associated with those alternate systems. Furthermore, it would be desirable to devise a system that retains the ability to control the validity of the security codes by updating only the security system controller without requiring on-site work.

BRIEF SUMMARY OF THE INVENTION

An apparatus for simulating keypad entry of an access code into a security system controller. The apparatus comprises at least one electronic key encoded with a electronic key identifier, at least one electronic key reader adapted to electronically interface with the electronic key to electronically transfer data signals therebetween, a security system controller having memory for storing at least one security code therein and operably connected to a keypad for entering access codes thereon, and simulator circuitry electrically connected to the electronic key reader and operably electrically connected to the security system controller, whereby upon presentation of the electronic key to the electronic key reader, the simulator circuitry interrogates the electronic key then translates the electronic key identifier into an access code. The simulator circuitry then generates output signals to the security system controller to simulate pressing of keys on the keypad corresponding to the access code, whereupon if the simulated access code matches one of the security codes stored in the security system controller's memory, the security system will be activated/deactivated as if the access code was manually entered through the keypad.

Other objects, advantages, and novel features of the present invention will become apparent from the following detailed description of the invention when considered in conjunction with the accompanying drawings.

DETAILED DESCRIPTION OF THE INVENTION

Figure 1:
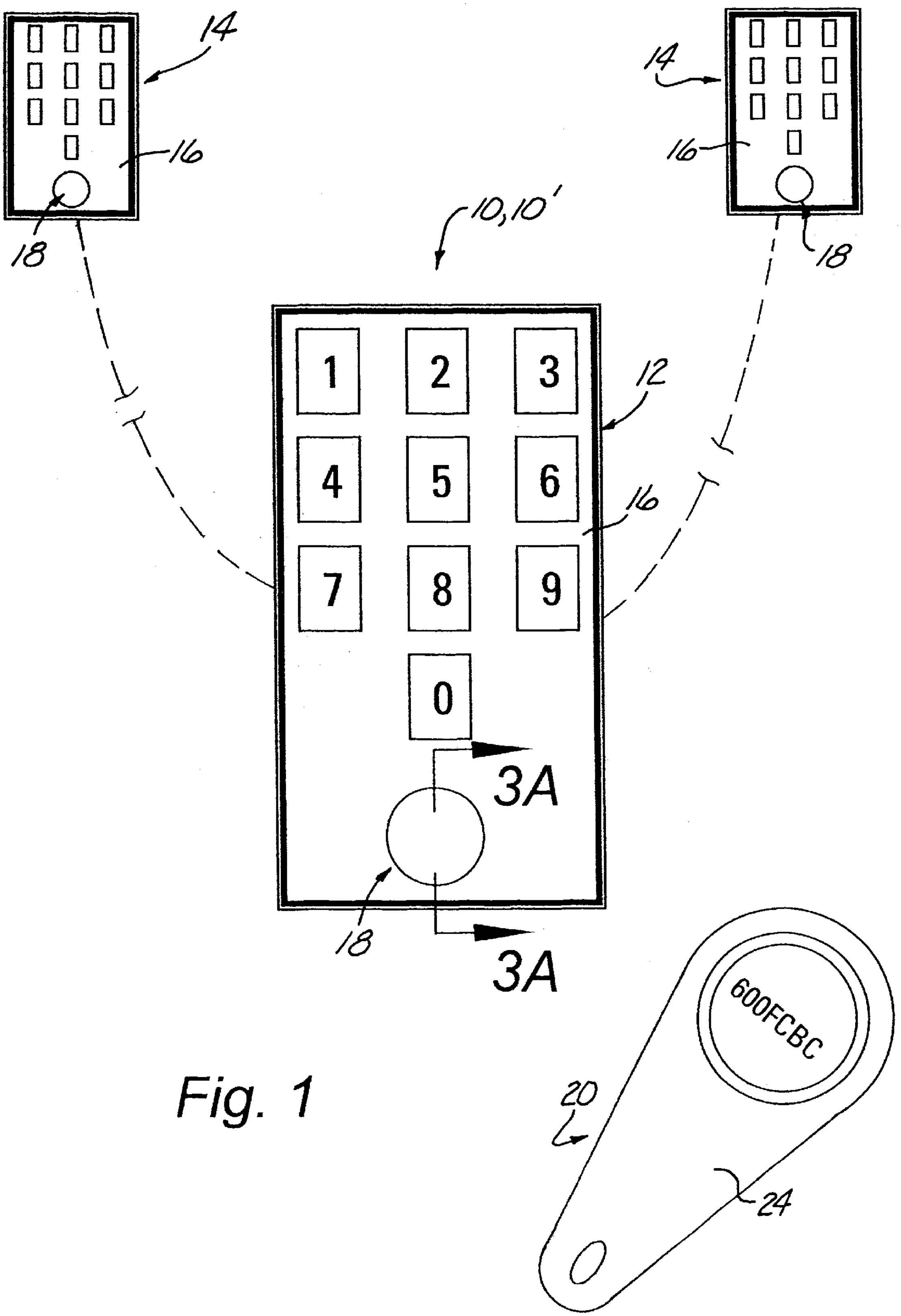
FIG. 1 shows a security system in accordance with the present invention comprising a security system controller and a plurality of remote access stations.

Referring now to the drawings, wherein like reference numerals designate identical or corresponding parts throughout the several views, FIG. 1 shows a security system (10) which comprises, generally, a main security system controller (12) and, as is typical in most security systems, a plurality of remote entry stations (14). The system controller (12) and each of the remote entry stations (14) each include a conventional alphanumeric keypad type face panel (16) for entering an access code to activate/deactivate the system (10). Each of the face panels (16) further include a conventional electronic key reader (18) which electronically interfaces with a electronic key (20).

The electronic keys (20) and electronic key readers (18) are well known in the art and may be of any make and model. However, for the purpose of this specification, the preferred electronic keys (20) and electronic key readers (18) are the DS1990 TouchMemory® devices as manufactured by Dallas Semiconductor Corporation of Dallas, Tex. Similarly, the keypad type security system controllers (12) are well known in the art and may be of any make and model. Again, however, for the purposes of this specification, the preferred keypad type controller (12) is the CADDX NX-8 alarm system and/or the CADDX 8980E alarm system as manufactured by CADDX Controls, Inc., 1420 N. Main Street, Gladewater, Tex. 75647. It should be understood that specific identification of the type of electronic keys, electronic key readers, and system controllers are included in this specification only for the purpose of providing an enabling disclosure and for disclosing the inventors' best mode for practicing the invention at the time the application was filed. Thus, because different types of electronic keys, electronic key readers and keypad type controllers may be used, the scope of the present invention should not be considered limited to the above identified makes and models of such components.

Figure 2A:
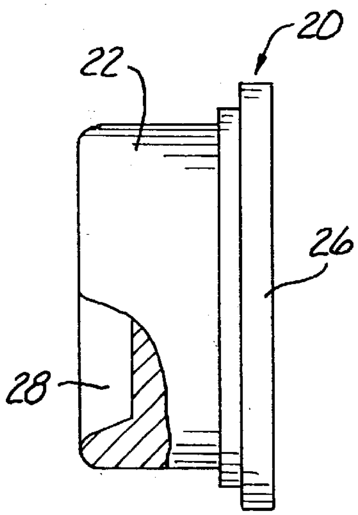
FIG. 2A shows a partial cross-sectional view of the preferred electronic key of the present invention.
Figure 2B:
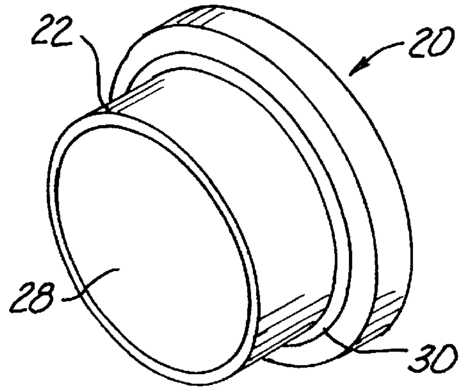
FIG. 2B shows a perspective view of the preferred electronic key of FIG. 2A.

The preferred electronic key (20), is simply a transportable device comprised of a small metal enclosure (22) (FIGS. 2A, 2B) housed within a holder (24) (FIG. 1) for easy handling. The metal enclosure (22) preferably contains a silicon chip (not shown) having a permanently encoded read only memory (ROM) which has been factory programmed with a unique 64-bit identifier or serial number, referred to hereinafter as the "electronic key identifier" or simply "identifier". This identifier, may also be stamped in hexidecimal representation on the metal enclosure (22) in which the chip is contained. Preferably, no two electronic key devices (20) are manufactured with the same identifier. As best viewed in FIG. 2A, the electronic key (20) has two electrical contacts, a common or ground contact (26) connected to the metal enclosure (22), and a signal or data contact (28). For a more complete description of the DS1990 TouchMemory® reference is made to the manual entitled: *Book of DS*19*xx Touch Memory Standards,* 2d Ed., 1994 by Dallas Semiconductor Corporation, Dallas, Tex., the entire text of which is incorporated herein by reference.

Figure 3A:
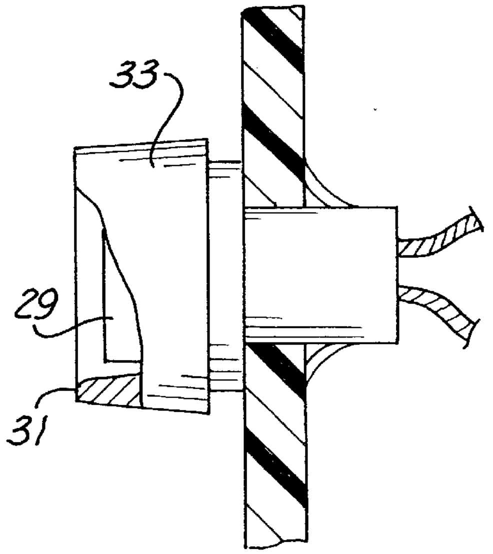
FIG. 3A shows a partial cross-sectional view of the preferred electronic key reader as viewed along lines 3A—3A of FIG. 1 attached to the face panel of a security system controller or a face panel of a remote access station.
Figure 3B:
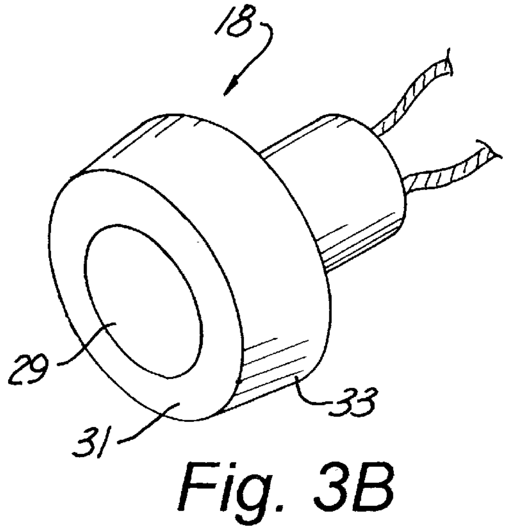
FIG. 3B shows a perspective view of the preferred electronic key reader of FIG. 3A.

The electronic key reader (18) is similar to the electronic key (20) except that it is preferably a socket type connector adapted to receive the electronic key (20) and to electronically interface therewith (discussed in detail later) by making electrical contact between the signal data contact (29) (FIGS. 3A, 3B) of the electronic key reader (18) with the signal data contact (28) of the electronic key (20). The electronic key reader (18) also includes a ground or common contact (31) connected to the metal enclosure (33). The electronic key reader (18) may be mounted to the face panel (16) of the security system controller (12) and/or to the face panel (16) of the remote entry station (14) as shown in FIG. 3A.

Figure 4:
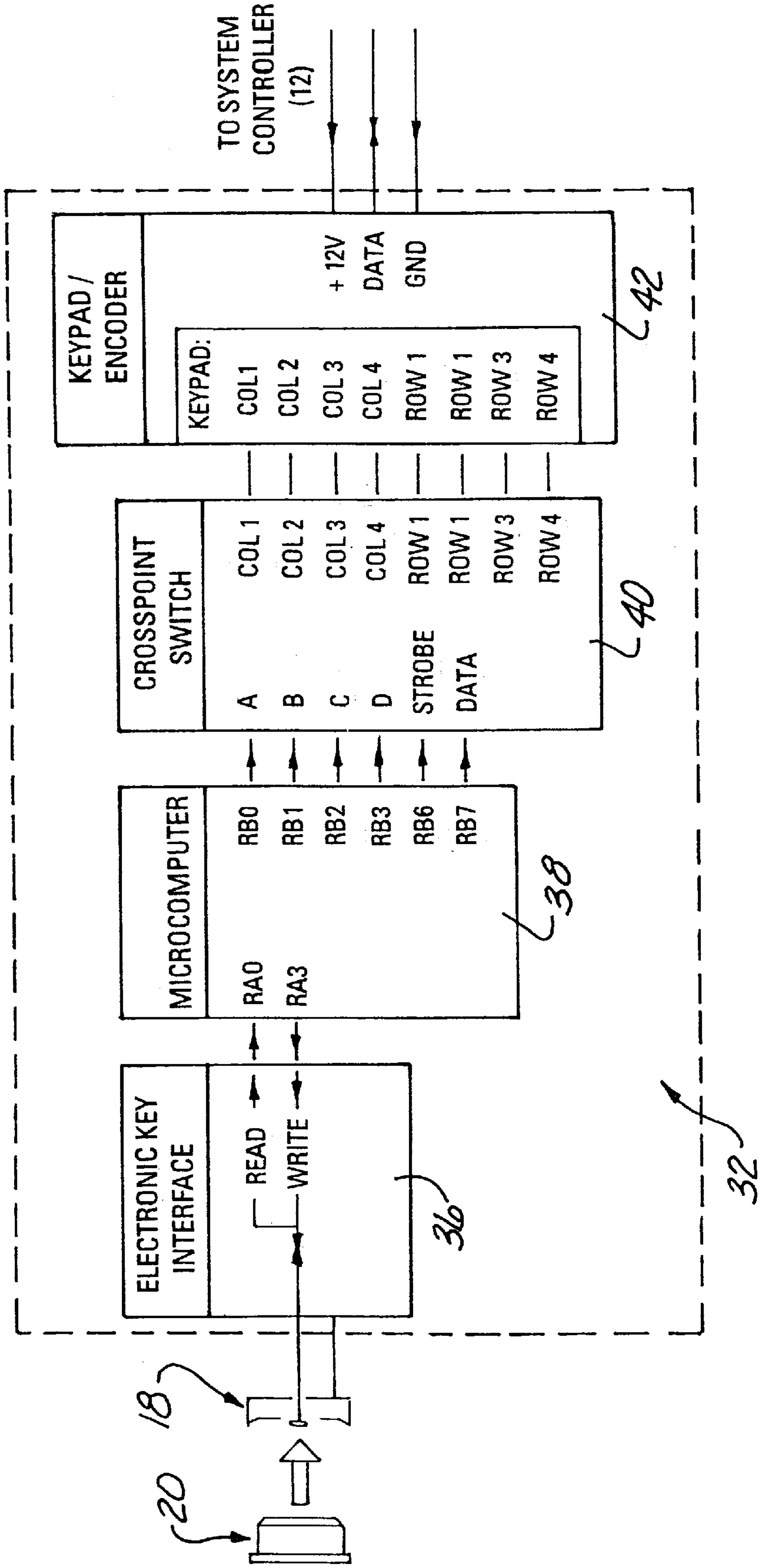
FIG. 4 is a block diagram of a first embodiment of the simulator circuitry of the present invention utilizing a crosspoint switch and keypad encoder to simulate the action of keypad entry of an access code on a 4×4 keypad array of a security system controller.

FIG. 4 is a block diagram showing the simulator circuitry (32) of the present invention which interfaces with the electrical circuitry of the preferred CADDX NX-8 security system controller (12). The simulator circuitry (32) is contained within the housing (34) of the system controller (12) and/or each of the remote entry stations (14) of the security system (10). The simulator circuitry (32) comprises a electronic key interface (36), a microcomputer (38), such as a PIC16C54 as manufactured by Microchip Technologies, Inc. 2355 W. Chandler Blvd. Chandler, Ariz. 85224, and a crosspoint switch or switch array (40), such as a 22100 4×4 as manufactured by Harris Semiconductor. Also preferably included in the simulator circuitry (32) is a keypad encoder (42). The operation of each of these components is discussed in detail below.

Figure 5A:
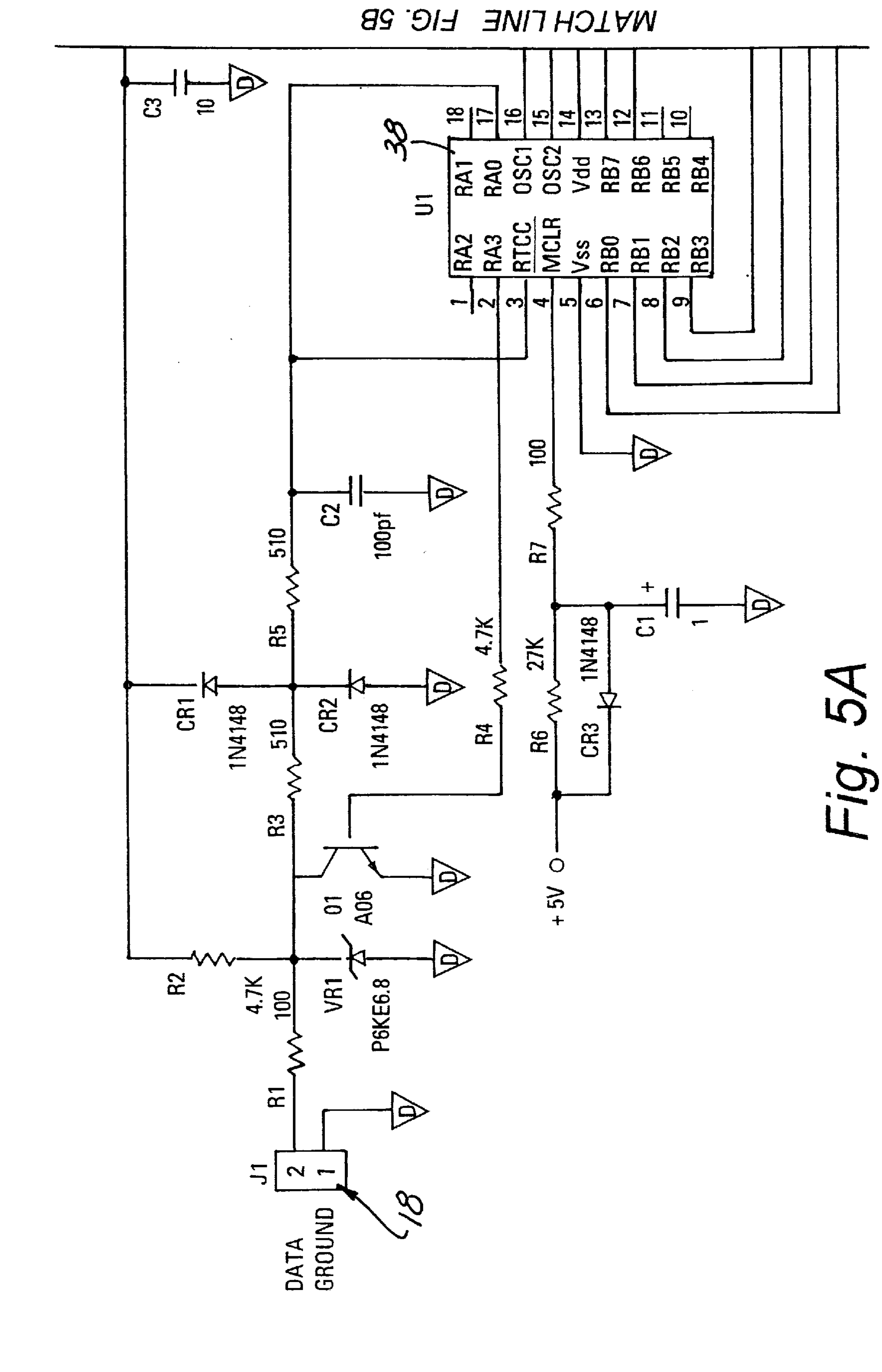
FIG. 5 is a schematic diagram of the simulator circuitry of FIG. 4.
Figure 5B:
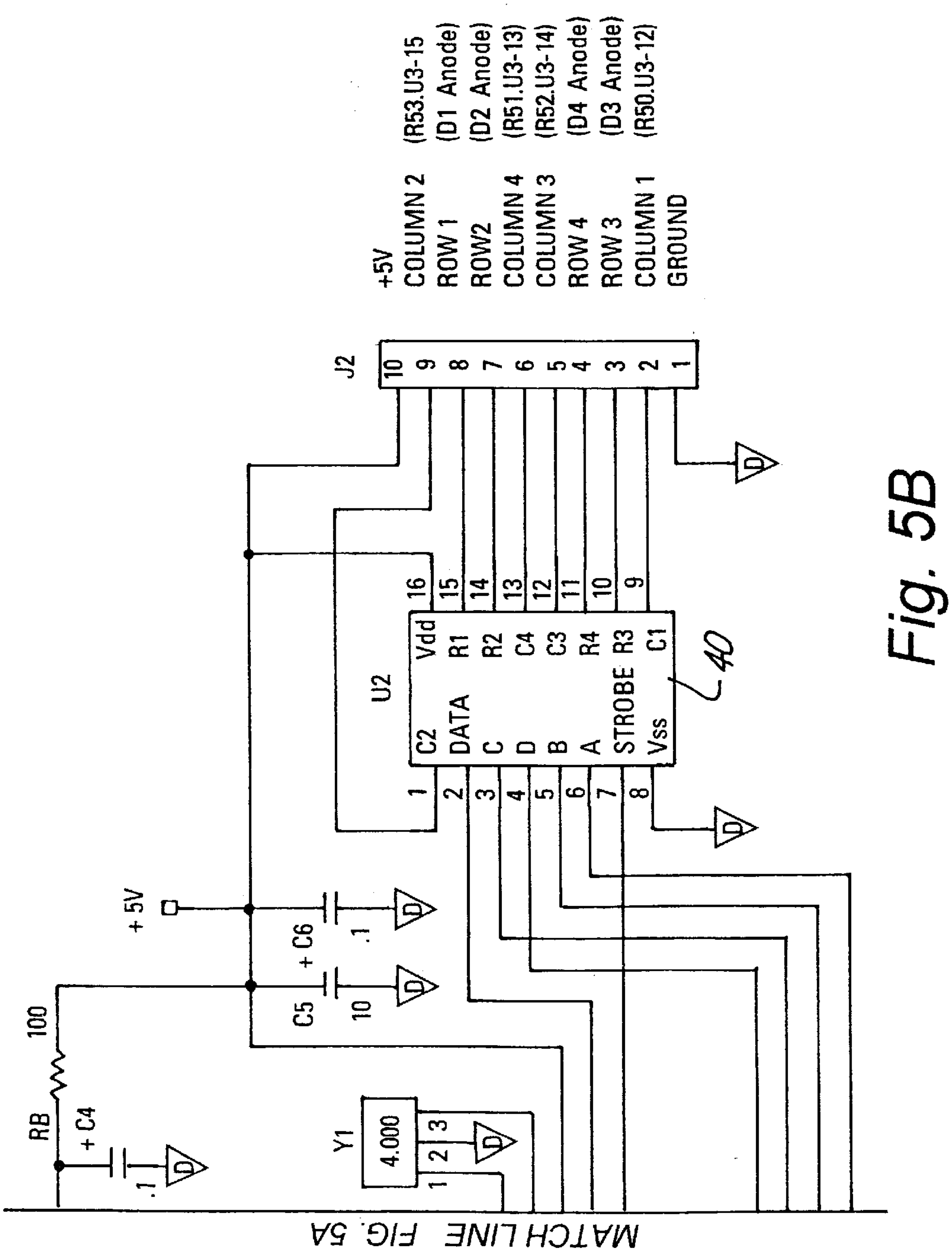

Turning now to FIG. 5, which is a schematic diagram of the simulator circuitry (32), resistors R1, R3 and R5, and diodes VR1, CR1 and CR2, and capacitor C2, are incorporated to provide transient protection for the microcomputer (38). Resistors R5 and R7, capacitor C1 and diode CR3 provide a delayed power on reset for the microcomputer (38). The 4 mhz clock Y1 provides the basis for timing interval determinations of the microcomputer (38). Note that there may be some differences in reference designator assignments and values between FIGS. 4 and 5, but functionally, the circuits are identical. The crosspoint switch (40) row and column arrangement is electrically connected to the row and column input arrangement of the keypad encoder (42). The keypad encoder (42) generates output from the crosspoint switch (40) to cause circuit activation in the system controller (12) in the same manner as depressing the keys on the keypad (18).

It should be appreciated that the simulator circuitry (32) of FIG. 5 illustrates the circuit required for operating a 4×4 keypad array, but the same circuit may be used to operate a smaller keypad array or extended to operate a larger keypad array.

Operation of the System

Through the above description and drawing figures, it should be evident that the purpose of the present invention (10) is to be able to momentarily position the electronic key (20) in the socket type electronic key reader (18) and have that action cause the crosspoint switch (40) and keypad encoder (42) to be activated in such a manner as to simulate the action of entering the required number of digits on the keypad (18) of the system controller (12) or remote entry station (14). Before discussing the operation of the present invention, the following definitions are provided for clarity:

Electronic key identifier=the serial number programmed into the electronic key (20). In the preferred embodiment, this is the unique 64-bit serial number programmed into the electronic key (20).

Access code(s)=the translated electronic key identifier having the required number of digits for simulated keypad entry into the system controller (12)—the security system (10) may or may not respond to the generated access code, depending on whether or not the access code matches one of the security codes programmed into the system controller (12).

Security code(s)=the system "password(s)" stored into the security system controller's memory, typically by the security system supplier, to which the security system controller (12) will respond to activate/deactivate the security system (10).

The security system (10) of the present invention operates in the following manner:

The system controller (12) continuously monitors the keypad of the system controller (12) and/or remote entry stations (14) for key closures which determine its state and course of action. It should be understood that the system controller (12) may be monitoring multiple keypads at one time depending on if there are multiple remote entry stations (14).

The simulator circuitry (32), through the electronic key interface (36), checks for the presence of a electronic key (20) at the socket of the electronic key reader (18) on or connected to each of the respective face panels (16) of the entry stations (12, 14). This is accomplished by supplying a +5 volt signal to the electronic key reader's socket data contact (29) (FIG. 3) which is periodically pulsed to ground while monitoring the status of that contact (29). When a electronic key (20) is positioned in the electronic key reader socket (18) the low pulse sent to the electronic key reader (18) will be extended by the electronic key (20) alerting the associated microcomputer (38) that a electronic key (20) is present and ready to be read and its identifier processed.

More specifically, referring to FIG. 5, the data contact (29) or signal pin of the electronic key reader (18) to which the electronic key (20) is presented, is normally held at +5 volts by pullup resistor R2. Periodically the microcomputer (38) will cause this data contact (29) to be pulled to ground by setting output pin RA3 of the microcomputer (38) to a "1", delaying, then returning it to a "0" causing Q1 to conduct for several microseconds. The state of this signal pin is monitored by the microcomputer (38) at RA0 which is programmed to be an input pin. The signal at RA0 is compared with that output at RA3 to determine if the signal line has been held low (i.e. due to the presence of a electronic key (20)). If a electronic key (20) is not present, RA0 will be low only as long as RA3 had been set high and no further processing will be required. This pulsing of the signal line and reading of its state, takes place at 1 millisecond intervals to check for the presence of a electronic key (20). When the electronic key (20) is present, it will respond to the pulsing of the signal line low by turning on an internal switch thus maintaining that signal line low beyond the period during which Q1 is conducting. This delayed release of the signal line is sensed by the microcomputer (38) by checking the state of input RA0. Detection of this delayed release of the signal line acknowledges the presence of the electronic key (20) and will begin the sequence of events needed to interrogate the electronic key (20) and read its identifier into memory in the microcomputer. Specific details of this timing and sequencing are detailed in the manual entitled: *Book of DS19xx Touch Memory Standards,* 2d Ed., 1994 by Dallas Semiconductor Corporation, Dallas, Tex., the entire text of which is incorporated herein by reference.

The code (see Appendix 1) programmed into the microcomputer (38) provides for detecting the presence of a electronic key (20) and reading its identifier into memory when it is detected. The detection and reading of the electronic key's identifier is referred to hereinafter as the interrogation process. As the electronic key identifier is read, it is processed to calculate and test the checksum value which is also stored in the electronic key (20). If the checksum is verified, then the information is processed, if not, the electronic key (20) is reread until a good read is attained or the electronic key (20) is no longer sensed as being present.

After the electronic key identifier is read from the electronic key (20) and its correctness verified, the microcomputer (38) begins the translation process to convert the electronic key identifier into an access code of the required number of digits for the simulated keypad entry into the security system controller (12). If this access code matches one of the security codes preprogrammed into the system controller (12), the security system (10) will be activated/deactivated as if the access code was manually entered through one of the keypads of one of the entry stations (12, 14).

The translation process is performed by an algorithm contained within the program code of the microcomputer (38). The translation process comprises truncating the preferred 64-bit electronic key identifier read from the electronic key (20) to 16-bits. Next, a unique encryption key (discussed later) programmed into the microcomputer (38), is preferably added to that value, although it should be understood that any kind of mathematical operation may be applied, such as a multiplier, a diviser, a square root, etc. The resulting value, referred to hereinafter as the "access code", is checked to determine that all required access code digits are not all the same. In the event that all access code digits are the same, the encryption key is modified by another mathematical operation, such as by multiplying it by a predetermined integer, to assure an alphanumeric combination which is not a string of identical digits. The check for identical digits is necessary because some security systems are programmed not to respond or will respond incorrectly if all digits of an access code are the same.

When the access code has been accepted, the microcomputer (38) then causes switches in the crosspoint switch (40) corresponding to the digits of the access code to be closed which in turn causes the keypad encoder (42), electrically connected thereto, to generate output to the security system controller (12) to simulate the pressing of keys on the keypad (18) of the face panel (16) of the security system controller (12) or a remote entry station (14). Pins RB0 through RB3 are outputs from the microcomputer (38) that tell the crosspoint switch (40) which switch is to be acted upon in its matrix while the data from output RB7 determines whether that switch is to be opened or closed and output RB6 from the microcomputer (38) causes that switch to be opened or closed as determined by the state of RB7. At reset, all switches in the crosspoint switch (40) are set to be open or off. The program in the microcomputer (38) causes the switches (in this example, there are four switches) to be first closed and then returned open in a time sequential manner. The timing is such that the switch is closed long enough to represent the action of depressing a key of the keypad (18) and time is allowed between opening one switch and closing the next switch to simulate releasing one key then depressing another. Presently the timing is such that the key is simulated as being closed for 200 ms followed by an open interval of 200 ms before the next key is simulated as being closed.

After all required key closures have been simulated by the crosspoint switch (40) and keypad encoder (42) the microcomputer (38) ensures that all keys are again open and then waits until it senses that the electronic key (20) has been removed from the electronic key reader (18) at which time it delays electronic key reads for several seconds and then begins checking for the presence of another electronic key (20).

As identified above, the generated multi-digit access code for a given electronic key (20) to which the security system (10) may or may not respond, depending on whether the access code matches one of the security codes programmed into the system controller (12), is determined by the translator program programmed into the microcomputer (38). The translator program code of Appendix 1 is written for the preferred DS1990A Touch Memory® system with the preferred CD22100 crosspoint switch.

The encryption key programmed into the microcomputer (38), which is added to the truncated 16-bit electronic key identifier to produce the access code, is a unique, randomly generated integer assigned to a specific security system supplier such that no security system supplier will have the same encryption key. Thus, the ability to program different encryption keys into the microcomputers (38) assures that the access code which is set to work on one supplier's security system (10) cannot work on another supplier's security system (10) even if their system controllers (12) have been programmed with the same security code. It should therefore be appreciated that since each electronic key (20) has a unique identifier, the algorithm containing the unique encryption key for a particular security system supplier must also be provided to that security system supplier for programing the security code for the security system controllers (12) so that the generated access codes of the electronic keys (20) can match the security codes for the corresponding security system controllers (12).

Figure 6:
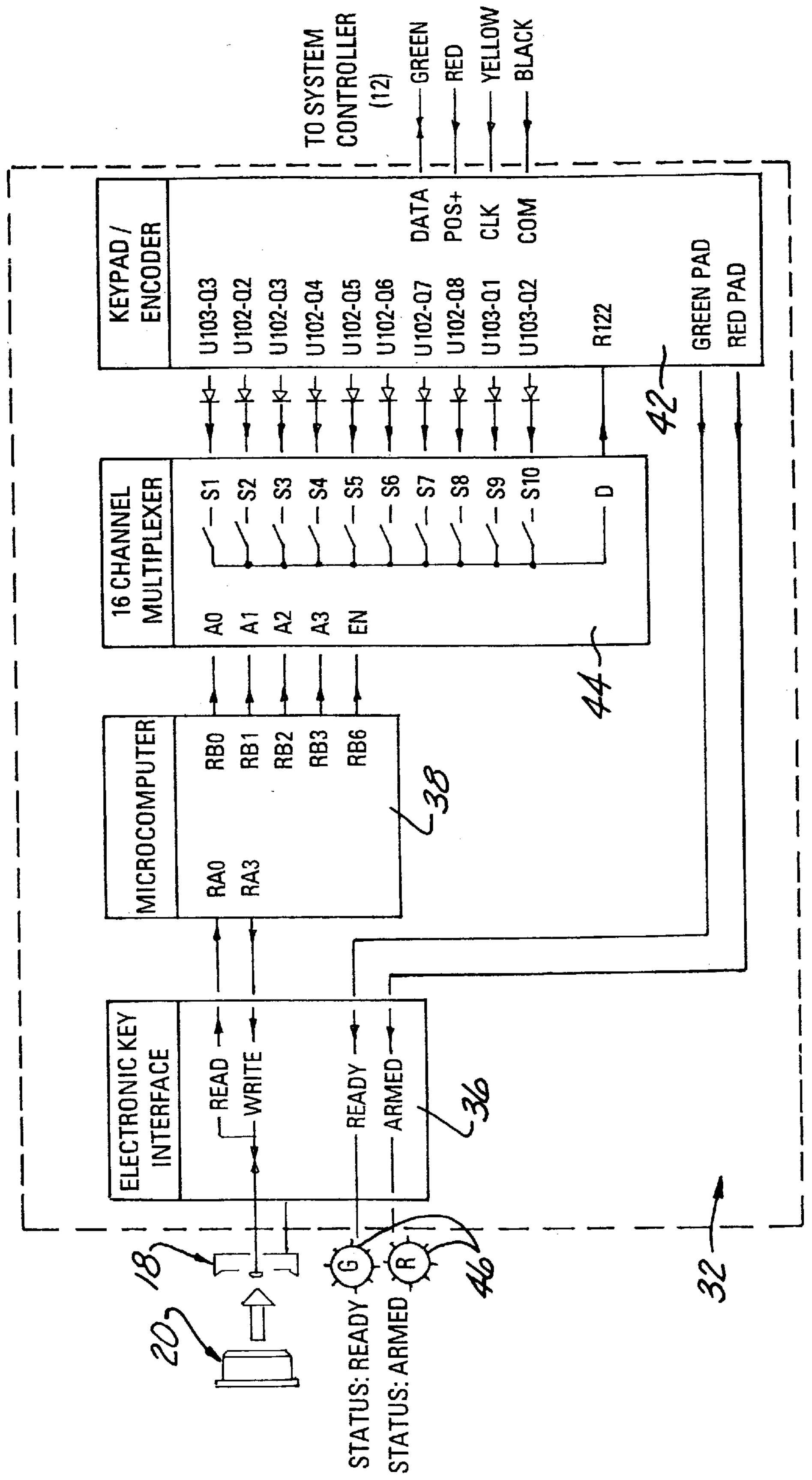
FIG. 6 is a block diagram of a second embodiment of the simulator circuitry of the present invention utilizing a 16 channel multiplexer to simulate the action of keypad entry of an access code on a keypad arranged with a common pole.

FIG. 6 shows a block diagram of the simulator circuitry (32) of a second embodiment (10') of the system of the present invention. The system (10') functions identically as that first described system (10), except that a multiplexer chip (44) is used rather than a crosspoint selector chip (40) to simulate the action of a keypad arranged with a common pole, such as in the CADDX 8980E system controller (12). In this embodiment, the preferred multiplexer (44) is the ADG406 as manufactured by Harris Semiconductor, which allows for the activation of one of sixteen individual switches, though only ten of the switches are shown connected to the keypad (18) on the face panel (16) of the system controller (12) or remote entry station (14).

The functioning of the simulator circuitry (32) of the second embodiment (10') is as previously described, and the processing of the data from the electronic key (20) is handled by the same code as that described for the first embodiment (10) with the exception that the code for the second embodiment (10'), is changed to close one of the switches in the multiplexer (44) to simulate pressing one of the ten numeric keys on the controller panel keypad. The program code written for the system (10') using the preferred DS1990A Touch Memory® system with the DG406 multiplexer is attached hereto as Appendix 2. In FIG. 6, outputs RB0 through RB3 determine which switch is to be closed and RB6 is used to gate that switch closed for the appropriate interval. As in the first described embodiment of the invention the switches are presently programmed to remain closed for 200 ms and there is a delay of 200 ms before closing the next switch to simulate action of a keypad by a human operator.

Thus, the key difference between the two described embodiments (10, 10') of the invention (10) is that the first embodiment (10) (FIG. 4) is used to simulate operation of a keypad with its switches arranged as an array. Whereas the second embodiment (10') (FIG. 6) is used to simulate operation of a keypad with its switches arranged with one terminal of each connected to a common line. Additionally, the second embodiment (10') (FIG. 6) shows two status LEDs (46) mounted on the face panel (16) of the system controller (12) or remote entry station (14).

While the forgoing has described particular embodiments in which the electronic key (20) is presented to a socketed electronic key reader (18) for interrogation, current technology now permits wireless or contactless proximity detection of such devices. If it is desired to use an RF link with the present invention (10) utilizing the preferred Touch-Memory® electronic keys (20) and electronic key readers (18) as manufactured by Dallas Semiconductor, the RF link must be electronically disposed between the electronic key reader (18) and the simulator circuitry (32), since the Dallas Semiconductor TouchMemory® devices do not have built-in RF link capabilities at the present time. The components and circuitry required to electrically dispose an RF link between the electronic key reader (18) and the simulator circuitry (32) such that physical contact between the electronic key (20) and electronic key reader (18) is not required is well known to those skilled in the art. Therefore, although the preferred embodiment of this invention is directed toward devices which require physical contact before data transfer can occur, electronic keys (20) and electronic key readers (18) having either built-in RF link capabilities or interfacing with an RF link disposed between the reader (18) and the simulator circuitry (32) should be considered within the scope of this invention.

Therefore it should be readily appreciated that the above described present invention solves the shortcomings associated with keypad entry type security systems in that the use of the electronic key devices (18, 20) eliminate the potential for users forgetting their access code, eliminates the possibility of entering the incorrect access code, eliminates the sharing of access codes with unauthorized users, and prevents the possibility of others observing the access code during keypad entry. Additionally, existing keypad type security systems can be modified or upgraded by simply adding the electronic key devices (18, 20) and associated simulator circuitry (32) of the present invention thereby minimizing the cost of completely replacing an existing security system. Further, electronic key devices are generally less expensive and do not have the problems associated with security systems utilizing bar code scanners, magnetic strip cards, and RF proximity cards. Finally, the present invention overcomes the need for on-site work to reprogram the electronic key readers (18) each time new security codes are added or removed from the security system controller (12). This is so because unlike currently available electronic key systems, the system controller (12) controls the validity of the security codes, not the electronic key reader (18). Thus, the security system provider can update the security system controller with valid security codes remotely by telephone connections without having to make on-site visits to also reprogram the electronic key reader (18) with acceptable access codes that match the valid security codes.

Thus, although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

We claim:

1. An apparatus for simulating keypad entry of an access code into a security system controller, said apparatus comprising:

(a) at least one electronic key encoded with a electronic key identifier;

(b) at least one electronic key reader adapted to electronically interface with said electronic key to electronically transfer data signals therebetween;

(b) a security system controller having memory for storing at least one security code therein and operably connected to a keypad for entering access codes thereon;

(c) simulator circuitry electrically connected to said electronic key reader and operably electrically connected to said security system controller, whereby upon presentation of said electronic key to said electronic key reader, said simulator circuitry interrogates said electronic key then translates said electronic key identifier into an access code, said simulator circuitry then generates output signals to said security system controller to simulate pressing of keys on said keypad corresponding to said access code, whereupon if said simulated access code matches one of said security codes stored in said security system controller memory, said security system will be activated/deactivated as if said access code was manually entered through said keypad.

2. The apparatus of claim 1 wherein said simulator circuitry includes:

(i) a electronic key interface;

(ii) a microcomputer having an interrogation and translation program executable thereon;

(iii) a switch;

whereby upon presentation of said electronic key to said electronic key reader, said electronic key interface and said microcomputer interrogates said electronic key by first detecting its presence then reading its identifier into said microcomputer memory, whereupon said microcomputer translates said electronic key identifier into an access code, said microcomputer then causes switches in said switch to close thereby generating electrical signals to said security system controller that simulates pressing of keys on said keypad corresponding to said access code, whereupon if said simulated access code matches one of said security codes stored in said security system controller's memory, said security system will be activated/deactivated as if said access code was manually entered through said keypad.

3. The apparatus of claim 2 wherein said simulator circuitry further comprises a keypad encoder electrically disposed between said switch and said security system controller, said keypad encoder ensuring that said electrical signals from said switch simulating said access code are compatible with electrical signal input requirements of said security system controller.

4. The apparatus of claim 3 wherein said interrogation and translation program for generating said access codes includes an algorithm which first converts said electronic key identifier read into said microcomputer memory into binary, then truncates said binary electronic key identifier into a predetermined number of bits, then applies an encryption key thereto, resulting in said access code.

5. The apparatus of claim 4 wherein said interrogation and translation program includes a digit check subroutine to ensure that said generated access code does not include a string of identical digits.

6. The apparatus of claim 5 wherein said encryption key is a randomly generated number assigned to a particular security system supplier.

7. The apparatus of claim 6 wherein said security system supplier programs said security system controller with said security codes by generating said security codes using said algorithm.

8. The apparatus of claim 1 wherein said electronic key reader electronically interfaces with said electronic key through electrical contact.

9. The apparatus of claim 1 wherein said electronic key reader electronically interfaces with said electronic key through an RF link.

* * * * *

UNITED STATES PATENT AND TRADEMARK OFFICE

CERTIFICATE OF CORRECTION

PATENT NO. : 6,629,245 B1 Page 1 of 1
DATED : September 30, 2003
INVENTOR(S) : Arthur D. Stone, William T. Mostyn and Maurice D. Krugman It is certified that error appears in the above-identified patent and that said Letters Patent is hereby corrected as shown below:

Title page, Item [54] and Column 1, lines 1-3,
Should read -- APPARATUS FOR SIMULATING KEYPAD ENTRY OF AN ACCESS CODE INTO A KEYPAD TYPE SECURITY SYSTEM --

Signed and Sealed this

Fourth Day of November, 2003

JAMES E. ROGAN
*Director of the United States Patent and Trademark Office*